(12) United States Patent
Greef et al.

(10) Patent No.: US 6,356,230 B1
(45) Date of Patent: Mar. 12, 2002

(54) INTERROGATORS, WIRELESS COMMUNICATION SYSTEMS, METHODS OF OPERATING AN INTERROGATOR, METHODS OF MONITORING MOVEMENT OF A RADIO FREQUENCY IDENTIFICATION DEVICE, METHODS OF MONITORING MOVEMENT OF A REMOTE COMMUNICATION DEVICE AND MOVEMENT MONITORING METHODS

(75) Inventors: Roy Greef, Boise; David Ovard, Meridian, both of ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 09/378,432

(22) Filed: Aug. 20, 1999

(51) Int. Cl.⁷ .............................................. G01S 13/42
(52) U.S. Cl. ........................... 342/127; 342/44; 342/56; 342/109; 342/133; 342/139; 342/146; 340/825.36
(58) Field of Search .............................. 342/42, 44, 51, 342/56, 109, 125, 127, 133, 139, 146; 340/825.36

(56) References Cited

U.S. PATENT DOCUMENTS

| | | | | |
|---|---|---|---|---|
| 4,075,632 A | | 2/1978 | Baldwin et al. ............... 342/44 |
| 4,510,495 A | * | 4/1985 | Sigrimis et al. ........... 340/10.34 |
| 4,618,861 A | * | 10/1986 | Gettens et al. ........... 340/10.41 |
| 4,926,182 A | | 5/1990 | Ohta et al. ..................... 342/44 |
| 5,150,310 A | * | 9/1992 | Greenspun et al. ......... 342/451 |
| 5,353,011 A | * | 10/1994 | Wheeler et al. ......... 340/572.4 |
| 5,381,137 A | * | 1/1995 | Ghaem et al. ........... 340/572.5 |
| 5,552,772 A | * | 9/1996 | Janky et al. ............. 340/573.4 |
| 5,568,119 A | * | 10/1996 | Schipper et al. ........ 340/825.37 |
| 5,617,060 A | | 4/1997 | Wilson et al. ............... 330/129 |
| 5,621,412 A | | 4/1997 | Sharpe et al. .................. 342/51 |
| 5,649,296 A | | 7/1997 | MacLellan et al. ......... 455/38.2 |
| 5,842,118 A | * | 11/1998 | Wood, Jr. .................... 455/101 |
| 5,920,261 A | * | 7/1999 | Hughes et al. ........... 340/568.8 |
| 5,977,913 A | * | 11/1999 | Christ ......................... 342/465 |
| 6,013,949 A | * | 1/2000 | Tuttle ......................... 257/723 |
| 6,023,610 A | * | 2/2000 | Wood, Jr. .................... 455/101 |
| 6,150,921 A | * | 11/2000 | Werb et al. ................ 340/10.1 |

* cited by examiner

*Primary Examiner*—John B. Sotomayor
(74) *Attorney, Agent, or Firm*—Wells St John P.S.

(57) ABSTRACT

Interrogators, wireless communication systems, methods of operating an interrogator, methods of monitoring movement of a radio frequency identification device, methods of monitoring movement of a remote communication device and movement monitoring methods are provided. According to one aspect, an interrogator includes communication circuitry configured to output a forward wireless signal to a radio frequency identification device and to receive a return wireless signal from the radio frequency identification device; and a processor coupled with the communication circuitry and configured to process the return wireless signal to monitor movement of the radio frequency identification device. Another aspect provides a method of operating an interrogator including the steps of outputting a forward wireless signal; receiving a return wireless signal from a radio frequency identification device; processing the return wireless signal; and monitoring movement of the radio frequency identification device after the processing.

65 Claims, 4 Drawing Sheets

INTERROGATORS, WIRELESS COMMUNICATION SYSTEMS, METHODS OF OPERATING AN INTERROGATOR, METHODS OF MONITORING MOVEMENT OF A RADIO FREQUENCY IDENTIFICATION DEVICE, METHODS OF MONITORING MOVEMENT OF A REMOTE COMMUNICATION DEVICE AND MOVEMENT MONITORING METHODS

TECHNICAL FIELD

The present invention relates to interrogators, wireless communication systems, methods of operating an interrogator, methods of monitoring movement of a radio frequency identification device, methods of monitoring movement of a remote communication device and movement monitoring methods.

BACKGROUND OF THE INVENTION

Electronic identification systems typically comprise two devices which are configured to communicate with one another. Preferred configurations of the electronic identification systems are operable to provide such communications via a wireless medium.

One such configuration is described in U.S. patent application Ser. No. 08/705,043, filed Aug. 29, 1996, assigned to the assignee of the present application, and incorporated herein by reference. This application discloses the use of a radio frequency (RF) communication system including communication devices. The disclosed communication devices include an interrogator and a remote transponder, such as a tag or card.

Such communication systems can be used in various applications such as identification applications. The interrogator is configured to output a polling or interrogation signal which may comprise a radio frequency signal including a predefined code. The remote transponders of such a communication system are operable to transmit an identification signal responsive to receiving an appropriate polling or interrogation signal.

More specifically, the appropriate transponders are configured to recognize the predefined code. The transponders receiving the code can subsequently output a particular identification signal which is associated with the transmitting transponder. Following transmission of the polling signal, the interrogator is configured to receive the identification signals enabling detection of the presence of corresponding transponders.

Such communication systems are useable in identification applications such as inventory or other object monitoring. For example, a remote identification device is initially attached to an object of interest. Responsive to receiving the appropriate polling signal, the identification device is equipped to output an identification signal. Generating the identification signal identifies the presence or location of the identification device and the article or object attached thereto.

Some conventional electronic identification systems utilize backscatter communication techniques. More specifically, the interrogator outputs a polling signal followed by a continuous wave (CW) signal. The remote communication devices are configured to modulate the continuous wave signal in backscatter communication configurations. This modulation typically includes selective reflection of the continuous wave signal. The reflected continuous wave signal includes the reply message from the remote devices which is demodulated by the interrogator.

SUMMARY OF THE INVENTION

The present invention provides interrogators, wireless communication systems, methods of operating an interrogator, methods of monitoring movement of a radio frequency identification device, methods of monitoring movement of a remote communication device and movement monitoring methods.

According to one aspect of the present invention, a wireless communication system includes an interrogator and a plurality of remote communication devices. The interrogator includes communication circuitry configured to output at least one wireless signal to the remote communication device. Exemplary remote communication devices include radio frequency identification devices. The communication circuitry of the interrogator is further configured to receive at least one wireless signal from the remote communication devices. In the described embodiment, the communication circuitry is configured to output a continuous wave signal and the remote communication devices are operable to backscatter modulate the continuous wave signal.

In certain aspects, a processor of the interrogator is configured to monitor movement of the remote communication devices relative to the interrogator responsive to the received wireless signals. The processor of the interrogator determines the phase of individual received wireless signals and the velocity and/or distance of travel of the remote communication devices responsive to the phase determination in some aspects.

In one configuration, the processor processes return wireless signals to determine phase of the return wireless signals at an initial moment in time. Thereafter, the processor measures a predefined period of time and process the return wireless signals again to determine phase of the return wireless signals at a subsequent moment in time after timing the predefined period of time. The processor can determine velocity and/or distance of travel information of the remote communication devices using the determined phase information.

Other structures and methods are provided according to other aspects of the present invention as described below.

BRIEF DESCRIPTION OF THE DRAWINGS

Preferred embodiments of the invention are described below with reference to the following accompanying drawings.

FIG. 7 is a flow chart illustrating an exemplary method to monitor movement of a remote communication device.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

Figure 1:
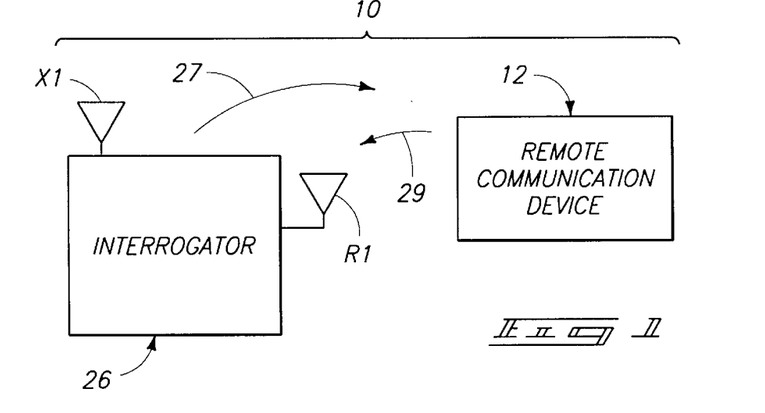
FIG. 1 is a block diagram of an exemplary wireless communication system.

FIG. 1 illustrates a wireless communication system 10 embodying the invention. Communication system 10 is configured as an electronic identification system in the embodiment described herein. Other applications of communication system 10 are possible. Further, the described communication system 10 is configured for backscatter communications as described further below. Other communication protocols are utilized in other embodiments.

The depicted communication system 10 includes at least one electronic wireless remote communication device 12 and an interrogator 26. Radio frequency communications can occur intermediate remote communication device 12 and interrogator 26 for use in identification systems and product monitoring systems as exemplary applications.

Devices 12 include radio frequency identification devices (RFID) or remote intelligent communication (RIC) devices in the exemplary embodiments described herein. Remote intelligent communication devices can perform functions in addition to identification functions. Exemplary devices 12 are disclosed in U.S. patent application Ser. No. 08/705,043, filed Aug. 29, 1996. Plural wireless remote communication devices 12 typically communicate with interrogator 26 although only one such device 12 is illustrated in FIG. 1. Such a remote communication device 12 can be referred to as a tag or card as illustrated and described below.

Although multiple remote communication devices 12 can be employed in communication system 10, there is typically no communication between multiple devices 12. Instead, the multiple communication devices 12 communicate with interrogator 26. Multiple communication devices 12 can be used in the same field of interrogator 26 (i.e., within the communications range of interrogator 26). Similarly, multiple interrogators 26 can be in proximity to one or more of remote communication devices 12.

The above described system 10 is advantageous over prior art devices that utilize magnetic field effect systems because, with system 10, a greater range can be achieved, and more information can be communicated (instead of just identification information). As a result, such a system 10 can be used, for example, to monitor large warehouse inventories having many unique products needing individual discrimination to determine the presence of particular items within a large lot of tagged products.

Remote communication device 12 is configured to interface with interrogator 26 using a wireless medium in one embodiment. More specifically, communications intermediate communication device 12 and interrogator 26 occur via an electromagnetic link, such as an RF link (e.g., at microwave frequencies) in the described embodiment. Interrogator 26 is configured to output forward link wireless communications 27. Further, interrogator 26 is operable to receive reply or return link wireless communications 29 from remote communication devices 12 responsive to the outputting of forward communication 27.

In accordance with the above, forward communications 27 and return communications 29 individually comprise wireless signals, such as radio frequency signals, in the described embodiment. Other forms of electromagnetic communication, such as infrared, acoustic, etc. are possible.

Interrogator unit 26 includes a plurality of antennas X1, R1, as well as transmitting and receiving circuitry, similar to that implemented in devices 12. Antenna X1 comprises a transmit antenna and antenna R1 comprises a receive antenna individually connected to interrogator 26.

In operation, interrogator 26 transmits the interrogation command or forward communication signal 27 via antenna X1. Communication device 12 is operable to receive the incoming forward link signal. Upon receiving signal 27, communication device 12 is operable to respond by communicating the responsive reply or return communication signal 29.

In one embodiment, responsive signal 29 is encoded with information that uniquely identifies, or labels the particular device 12 that is transmitting, so as to identify any object, animal, automobile, person, etc. with which remote communication device 12 is associated.

More specifically, remote communication device 12 is configured to output an identification signal within return wireless communication 29 responsive to receiving forward wireless communication 27. Interrogator 26 is configured to receive and recognize the identification signal within the return wireless communication 29. The identification signal can be utilized to identify the particular transmitting communication device 12.

Figure 2:
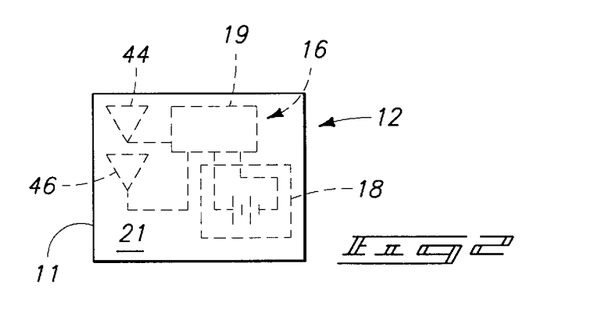
FIG. 2 is a front view of an exemplary remote communication device of the communication system.

Referring to FIG. 2, one embodiment of remote communication device 12 is illustrated. The depicted remote communication device 12 includes communication circuitry 16 having a receiver and a transmitter. Communication circuitry 16 may be implemented as transponder circuitry in one configuration. Exemplary communication circuitry 16 includes a small outline integrated circuit (SOIC) 19 available as radio frequency identification device (RFID) circuitry from Micron Communications Inc., 3176 South Denver Way, Boise, Id. 83705 under the trademark MicroStamp (TM) Engine and having designations MSEM256X10SG, MT59RC256R1FG-5.

Communication circuitry 16 is configured to receive and process communication signals. Exemplary processing includes analyzing the received communication signal for identification information and processing commands within the communication signal. More or less processing can be performed by communication circuitry 16. Thereafter, communication circuitry 16 selectively generates communication signals for communication to interrogator 26. Remote communication device 12 further includes a power source 18 connected to communication circuitry 16 to supply operational power to communication circuitry 16 including integrated circuit 19.

Power source 18 is a thin film battery in the illustrated embodiment, however, in alternative embodiments, other forms of power sources can be employed. If the power source 18 is a battery, the battery can take any suitable form. Preferably, the battery type will be selected depending on weight, size, and life requirements for a particular application. In one embodiment, battery 18 is a thin profile button-type cell forming a small, thin energy cell more commonly utilized in watches and small electronic devices requiring a thin profile. A conventional button-type cell has a pair of electrodes, an anode formed by one face and a cathode formed by an opposite face. In an alternative embodiment, the battery comprises a series connected pair of button type cells.

Communication device 12 further includes at least one antenna connected to communication circuitry 16 and configured for at least one of wireless transmission and reception. In the illustrated embodiment, communication device 12 includes at least one receive antenna 44 connected to communication circuitry 16 for radio frequency reception by communication circuitry 16, and at least one transmit antenna 46 connected to communication circuitry 16 for radio frequency transmission by communication circuitry 16.

Receive antenna 44 is configured to receive forward wireless signals 27 and apply communication signals corresponding to the received wireless signals to communication circuitry 16. Transmit antenna 46 is configured to receive generated communication signals from communication circuitry 16 and output return wireless signals 29 corresponding to the generated communication signals. The described antennas are implemented as printed microstrip antennas in one configuration. Further, receive antenna 44 comprises a loop antenna and the transmit antenna 46 comprises a dipole antenna in the described configuration. Transmit antenna 46 has plural dipole halves 47, 48 in the configuration illustrated in FIG. 4.

Communication device 12 can be included in any appropriate housing or packaging. FIG. 2 shows but one example of a housing in the form of a miniature housing 11 encasing device 12 to define a tag which can be supported by an object (e.g., hung from an object, affixed to an object, etc.).

Figure 3:
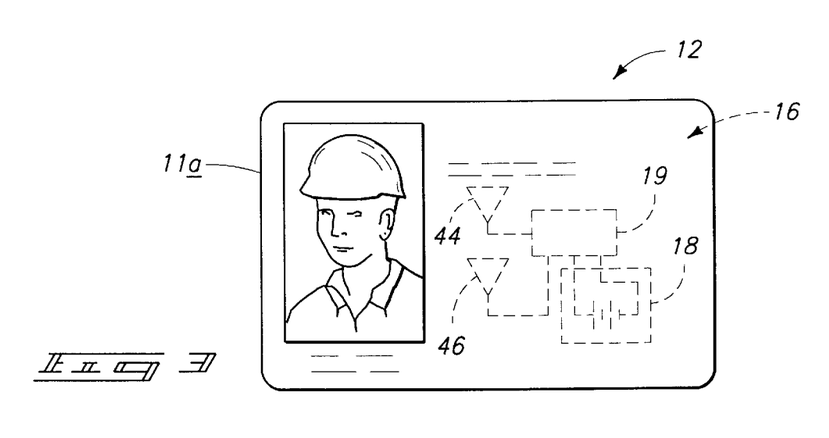
FIG. 3 is a front view of another remote communication device configuration.

Referring to FIG. 3, an alternative configuration of housing 11a of remote communication device 12 is illustrated. FIG. 3 shows remote communication device 12 having housing 11a in the form of a card. Card housing 11a preferably comprises plastic or other suitable material. Remote communication device 12 may be utilized as an employee identification badge including the communication circuitry 16. In one embodiment, the front face of housing 11a has visual identification features such as an employee photograph or a fingerprint in addition to identifying text.

Although two particular types of housings have been disclosed, the communication device 12 can be included in any appropriate housing. Communication device 12 is preferably of a small size that lends itself to applications employing small housings, such as cards, miniature tags, etc. Larger housings can also be employed. The communication device 12, provided in any appropriate housing, can be supported from or attached to an object in any desired manner.

Figure 4:
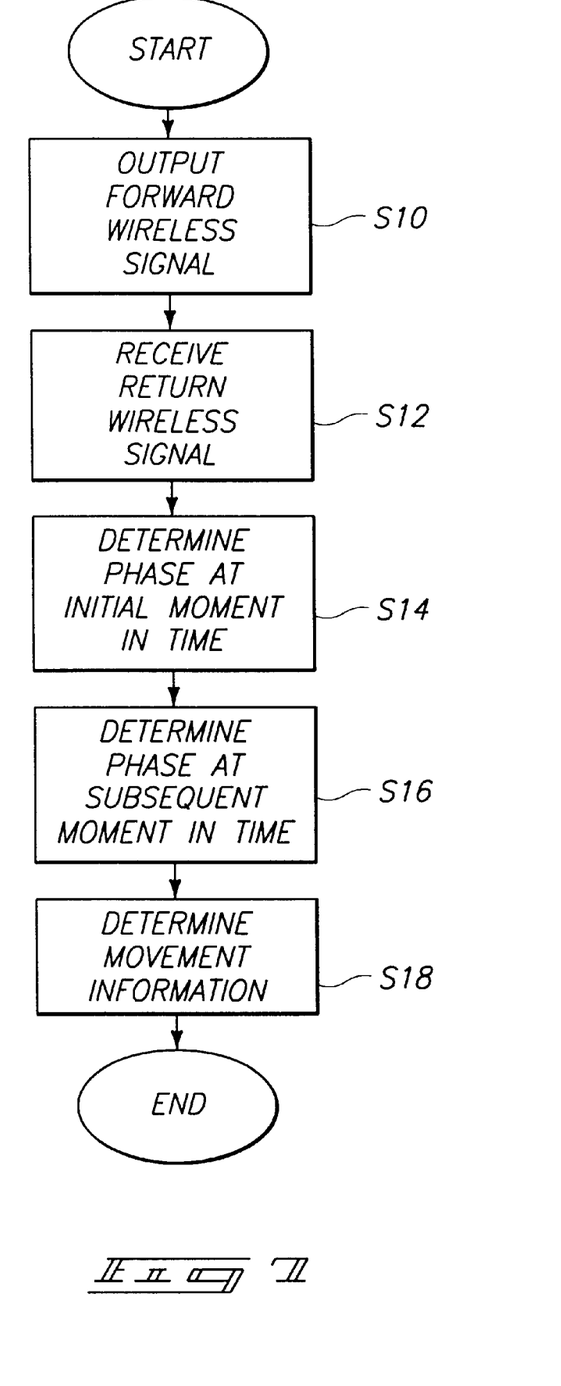
FIG. 4 is a high level schematic diagram of hardware components of an exemplary interrogator of the communication system.

Referring to FIG. 4, one embodiment of interrogator 26 is illustrated. The depicted interrogator 26 includes a processor 70, a field programmable gate array (FPGA) 72, and an RF section 74. In the depicted embodiment, processor 70 comprises a MC68340 microcontroller available from Motorola, Inc. FPGA 72 comprises an XC4028 device available from Xilinx, Inc. Further details of components 70, 72, 74 are described below.

RAM 76, EPROM 78 and flash memory 80 are coupled with processor 70 in the depicted embodiment. Processor 70 is configured to access an applications program for controlling the interrogator 26 and interpreting responses from devices 12. Processor 70 is configured to control communication operations with remote communication devices 12 during normal modes of operation. The applications program can also include a library of radio frequency identification device applications or functions. These functions effect radio frequency communications between interrogator 26 and communication device 12.

RF section 74 is configured to implement wireless (e.g., radio frequency) communications with remote communication devices 12. DPSK modulation techniques can be utilized for communications intermediate devices 12 and interrogator 26. RF section 74 can include downconversion circuitry as described below for generating in-phase (I) and quadrature (Q) signals which contain the DPSK modulated subcarrier for application to FPGA 72 during return link communications.

Plural antennas, including a transmit antenna X1 and a receive antenna R1, are coupled with RF section 74 to provide wireless RF communications. Plural RF transmit (TX) ports and RF receive (RX) ports (not shown) are coupled with RF section 74 in a preferred embodiment. Provision of plural TX ports and RX ports enables interrogator 26 to minimize the effects of multipath when communicating with plural remote communication devices 12.

Analog to digital converters 82, 84 provide received analog RF signals into a digital format for application to FPGA 72. In particular, analog to digital converters 82, 84 are implemented intermediate FPGA 72 and RF section 74 for both in-phase (I) and quadrature (Q) communication lines. An additional connection 85 is provided intermediate FPGA 72 and RF section 74. Digital signals outputted from FPGA 72 via connection 85 are converted to RF signals by RF section 74. Connection 85 can be utilized to transmit phase lock loop (PLL) information, antenna diversity selection information and other necessary communication information. During forward link communications, FPGA 72 is configured to format communication packets received from processor 70 into a proper format for application to RF section 74 for communication.

FPGA 72 is configured to demodulate return link communications received from remote communication devices 12 via RF section 74. FPGA 72 is configured in the described embodiment to perform I and Q combination operations during receive operations. The described FPGA 74 further includes delay and multiplication circuitry to remove the subcarrier. FPGA 74 can also include bit synchronization circuitry and lock detection circuitry. Data, clock and lock detection signals generated within FPGA 74 are applied to processor 70 for processing in the described embodiment.

Processor 70 is configured to control operations of interrogator 26 including outputting of forward link communications and receiving reply link communications. EPROM 78 is configured to store original code and settings selected for the particular application of communication system 10. Flash memory 80 is configured to receive software code updates which may be forwarded to interrogator 26.

RAM device 76 is configured to store data during operations of communication system 10. Such data can include information regarding communications with associated remote communication devices 12 and status information of interrogator 26 during normal modes of operation.

Figure 5:
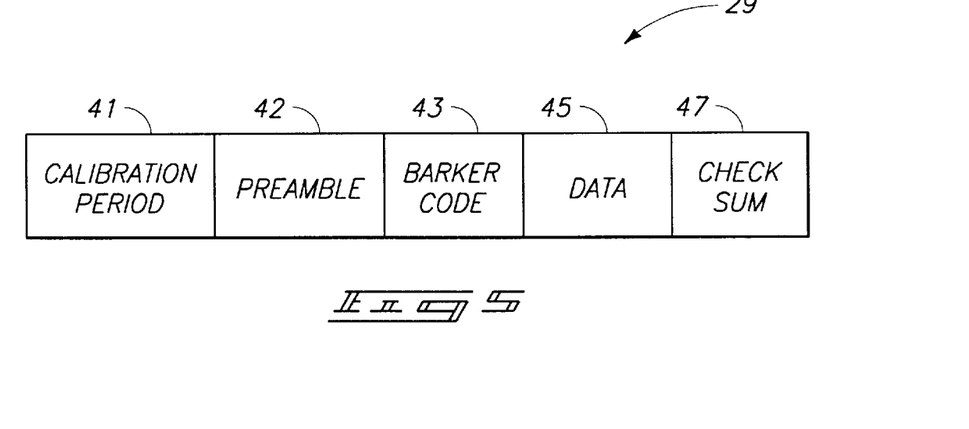
FIG. 5 is an illustrated representation of a return wireless signal for the remote communication device.

Referring to FIG. 5, an exemplary return wireless signal 29 is illustrated for implementing communications from remote communication device 12 to interrogator 26. The depicted return wireless signal 29 includes a plurality of fields. As indicated, the return wireless signal 29 includes a calibration period 41, preamble 42, Barker code 43, data 45 and check sum 47. Remote communication device 12 of FIG. 1 is configured to backscatter modulate a continuous wave signal from interrogator 26 to communicate return wireless signal 29 and the indicated fields in the described embodiment. More specifically, remote communication device 12 can selectively reflect the continuous wave signal outputted from interrogator 26 to provide backscatter modulation in accordance with the described configuration of wireless communication system 10.

Figure 6:
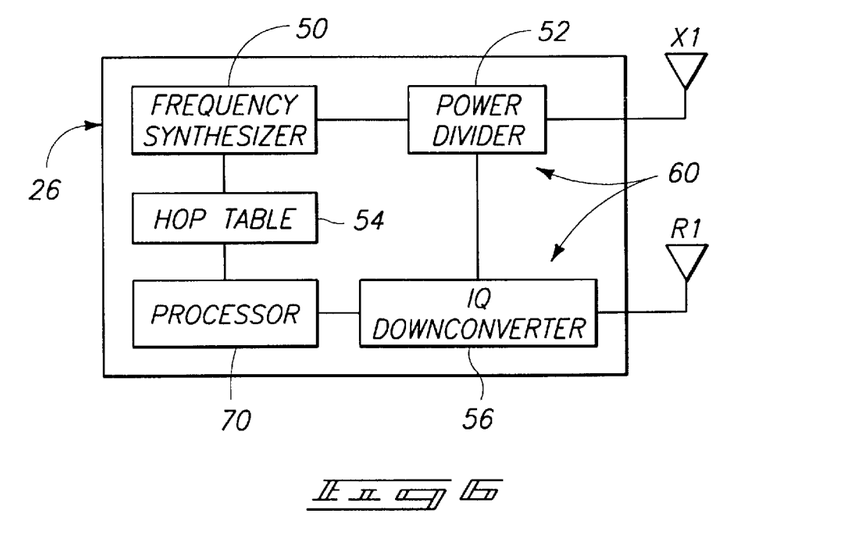
FIG. 6 is a functional block diagram illustrating components of an exemplary interrogator.

Referring to FIG. 6, interrogator 26 includes a frequency synthesizer 50, power divider 52, hop table 54, IQ downconverter 56 and processor 70. Components 50, 52, 54, 56 provide communication circuitry 60 of interrogator 26 in the described configuration. Other configurations of communication circuitry 60 are possible.

Frequency synthesizer 50 and power divider 52 may be implemented within RF Section 74 of FIG. 4. Hop table 54 can be provided within FPGA 72 of interrogator 26. Further, IQ downconverter 56 may be implemented within RF Section 74 to apply I and Q signals to analog to digital converters 82, 84, respectively as shown in FIG. 4.

As illustrated in FIG. 6, power divider 52 is coupled with transmit is antenna X1 and IQ downconverter 56 is coupled with receive antenna R1. Power divider 52 applies the forward signals to IQ downconverter 56 as well as transmit antenna X1. Application of the forward signals to be communicated using transmit antenna X1 to IQ downconverter 56 via power divider 52 provides a coherent interrogator configuration.

As described in further detail below, processor 70 is configured to monitor movement or motion of remote communication device 12 responsive to received return wireless signals 29. More specifically, processor 70 is configured to determine the phase of individual received return wireless signals and to determine the velocity and/or distance of travel of remote communication device 12 responsive to such phase determinations.

While performing phase calculation operations, processor 70 utilizes output signals of IQ downconverter 56. In the described embodiment, such output signals comprise two IF signals that are in quadrature to one another (i.e., the phase of I is 90 degrees from the phase of Q). The described IQ downconverter 56 downconverts a received return wireless signal to a 600 kHz subcarrier IF. Processor 70 calculates the phase of the received return wireless signal by determining the ARC tangent of the ratio of the amplitudes of the I and Q signals.

The described configuration of wireless communication system 10 operates at 2.44 GHz. Such may be referred to as a base communication frequency. Interrogator 26 can be configured to perform frequency hop operations. For example, such frequency hopping operations according to one embodiment are described in a copending U.S. patent application entitled "Interrogators, Wireless Communication Systems, Methods of Operating an Interrogator, Methods of Operating a Wireless Communication System and Methods of Determining Range of a Remote Communication Devices", filed the same day as the present application, having attorney docket number MI40-201, having the same inventors as the inventor hereof, and incorporated herein by reference.

The described configuration of interrogator 26 operates to process return wireless signals to determine velocity and distance of movement of remote communication device 12. Processor 70 is configured to process return wireless signals from remote communication device 12 at a plurality of moments in time to provide velocity and distance of travel information. More specifically, the velocity or speed of remote communication device 12 relative to interrogator 26 may be determined according to the following equation:

$$V = \left(\frac{\Delta \phi}{\Delta \tau}\right)\left(\frac{c}{f}\right)\left(\frac{1}{360°}\right)\left(\frac{1}{2}\right)$$

wherein $\Delta\phi$ is equal to a change in phase between samples of the return wireless signals, $\Delta t$ is equal to the time between samples, c equals the speed of light, and f equals the communication frequency of the return wireless signals.

Frequency synthesizer 50 implements the communication frequency of wireless communication system 10. Hop table 54 operates to control frequency synthesizer 50 to provide a desired communication frequency at a given time during operations. Hop table 54 can comprise a list of predefined values to control adjustment of communication frequencies of frequency synthesizer 50 "on the fly" during communications intermediate interrogator 26 and remote communication device 12. Frequency adjustments occur during periods of communications wherein data is not communicated (e.g., during preamble 42).

Processor 70 can access such control values from hop table 54. Accordingly, processor 70 has information of the communication frequency of wireless communication system 10 during communications. Such information may be utilized in the above equation to determine velocity and distance of travel information of remote communication device 12. In the described embodiment, processor 70 is configured to determine velocity and distance of travel of remote communication device 12 using the frequency information from hop table 54 and the internally calculated phases of return wireless signals 29.

Utilizing the above method and equation, samplings of phase of the return wireless signal should occur corresponding to the return wireless signal being at the same frequency for both samplings. Otherwise, inaccuracies in the velocity and distance of travel calculations will be experienced using the above equation.

Furthermore, timing of the sampling of phase of return wireless signals is carefully selected to avoid ambiguous results and provide increased accuracy in the described arrangement. For example, if the time duration intermediate samplings of return wireless signals is too large, a rollover problem may be experienced. Such is inherent when utilizing phase calculations inasmuch as the phase rolls over every 360 degrees.

Using the above equation, a maximum time period between samplings is determined to minimize effects of the rollover problem. More specifically, a maximum velocity of wireless communication system 10 may be inserted in the equation along with 360 degrees as a maximum calculated phase (or 180 degrees or other value depending upon the range of calculations of the particular phase calculator being utilized). Solving the equation provides a maximum allowed time period intermediate samplings of the return wireless signal to avoid the ambiguous rollover problem.

Using such information, a predefined moment in time may be determined following an initial phase calculation to provide a subsequent phase calculation. Accordingly, processor 70 is configured to process the return wireless signal to determine phase of the return wireless signal at an initial moment in time, to time a predefined period of time, and to process the return wireless signal to determine phase of the return wireless signal at a subsequent moment in time after measuring the predefined period of time.

Conversely, there exists a desire to provide an increased period of time intermediate the first and second samplings to provide increased accuracy of the movement monitoring of remote communication device 12. Thus, different maximum velocity values and corresponding time periods intermediate samples may be chosen depending upon a particular application of wireless communication system 10 and the expected maximum velocity of remote communication devices 12 used in such system 10. Using the above method, the timing of samplings can be determined to provide increased accuracy for an individual application.

The velocity determination may be utilized to provide distance of travel information for the remote communication device 12. The distance information corresponds to a distance of travel of remote communication device 12 in between samplings of the return wireless signal. More specifically, the velocity result obtained by the above equation can be multiplied by the time intermediate the samplings to provide such distance of travel information. Alternatively, the delta time variable may be removed from the above equation if it is desired to directly calculate such distance of travel information.

Referring to FIG. 7, one method of monitoring movement of remote communication device 12 by processor 70 is shown. Computer executable program code usable by processor 70 configured to implement the depicted method is stored in EPROM 78 in the described configuration. Alternatively, the described methodology may be implemented in hardware.

Initially, at step S10, processor 70 generates and outputs a forward wireless signal. Such can be communicated using antenna X1 of interrogator 26.

Next, interrogator 26 and processor 70 therein receive a return wireless signal from a remote communication device 12 at step S12. The return wireless signal is outputted by remote communication device 12 responsive to the forward wireless signal.

At step S14, processor 70 determines a phase of the return wireless signal at an initial moment in time. The determined phase can be stored within RAM device 76. Processor 70 then proceeds to step S16 to determine a phase of the return wireless signal at a subsequent moment in time. Processor 70 can again store the determined phase within RAM device 76.

Thereafter, processor 70 proceeds to step S18 to determine movement information of remote communication device 12 responsive to the phases determined in steps S14, S16. In the described embodiment, processor 70 calculates the velocity of remote communication device 12 and/or distance of travel of remote communication device 12 responsive to the phase determinations. The depicted method may be repeated for another remote communication device or the same remote communication device to monitor subsequent movements thereof.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. An interrogator comprising:
   communication circuitry configured to output a forward wireless signal to a radio frequency identification device and to receive a return wireless signal from the radio frequency identification device; and
   a processor coupled with the communication circuitry and configured to process the return wireless signal to monitor movement of the radio frequency identification device relative to the interrogator.

2. The interrogator according to claim 1 wherein the processor is configured to process the return wireless signal to determine a speed of the radio frequency identification device.

3. The interrogator according to claim 1 wherein the processor is configured to process the return wireless signal to determine a distance of travel of the radio frequency identification device.

4. The interrogator according to claim 1 wherein the processor is configured to process the return wirless signal to determine a change in position of the radio frequency identification device.

5. The interrogator according to claim 1 wherein the processor is configured to process the return wireless signal to determine phase of the return wireless signal at a plurality of moments in time.

6. The interrogator according to claim 1 wherein the processor is configured to process the return wireless signal to determine phase of the return wireless signal at a predefined moment in time.

7. The interrogator according to claim 1 wherein the processor is configured to process the return wireless signal to determine phase of the return wireless signal at an initial moment in time, to time a predefined period of time, and to process the return wireless signal to determine phase of the return wireless signal at a subsequent moment in time after timing the predefined period of time.

8. An interrogator comprising:
communication circuitry configured to output a forward wireless signal to a radio frequency identification device and to receive a return wireless signal from the radio frequency identification device; and
a processor coupled with the communication circuitry and configured to process the return wireless signal to determine a speed of the radio frequency identification device relative to the interrogator.

9. The interrogator according to claim 8 wherein the processor is configured to determine phase of the return wireless signal at a plurality of moments in time to determine the speed.

10. The interrogator according to claim 8 wherein the processor is configured to determine a distance of travel of the radio frequency identification device.

11. The interrogator according to claim 8 wherein the processor is configured to process the return wireless signal to determine phase of the return wireless signal at an initial moment in time, to time a predefined period of time, and to process the return wireless signal to determine phase of the return wireless signal at a subsequent moment in time after timing the predefined period of time.

12. A wireless communication system comprising:
an interrogator configured to output a forward wireless signal;
a radio frequency identification device configured to receive the forward wireless signal and output a return wireless signal responsive to the forward wireless signal; and
wherein the interrogator is configured to receive the return wireless signal and to monitor movement of the radio frequency identification device.

13. The system according to claim 12 wherein the interrogator is configured to determine a speed of the radio frequency identification device.

14. The system according to claim 12 wherein the interrogator is configured to determine a distance of travel of the radio frequency identification device.

15. The system according to claim 12 wherein the interrogator is configured to determine phase of the return wireless signal at a plurality of moments in time.

16. The system according to claim 12 wherein the interrogator is configured to process the return wireless signal to monitor the movement.

17. The system according to claim 12 wherein the interrogator is configured to determine phase of the return wireless signal at an initial moment in time, to time a predefined period of time, and to determine phase of the return wireless signal at a subsequent moment in time after timing the predefined period of time.

18. A wireless communication system comprising:
an interrogator configured to output a forward wireless signal;
a remote communication device configured to receive the forward wireless signal and output a return wireless signal responsive to the forward wireless signal; and
wherein the interrogator includes communication circuitry configured to receive the return wireless signal and a processor configured to determine phase of the return wireless signal at a plurality of moments in time to monitor movement of the remote communication device.

19. The system according to claim 18 wherein the processor is configured to determine the phase of the return wireless signal to determine a speed of the remote communication device.

20. The system according to claim 18 wherein the interrogator is configured to determine the phase of the return wireless signal to determine a distance of travel of the radio frequency identification device.

21. The system according to claim 18 wherein the processor is configured to determine phase of the return wireless signal at a predefined moment in time.

22. The system according to claim 18 wherein the interrogator is configured to determine phase of the return wireless signal at an initial moment in time, to time a predefined period of time, and to determine phase of the return wireless signal at a subsequent moment in time after timing the predefined period of time.

23. A wireless communication system comprising:
an interrogator configured to output a forward wireless signal;
a radio frequency identification device configured to receive the forward wireless signal and output a return wireless signal responsive to the forward wireless signal; and
wherein the interrogator includes communication circuitry configured to receive the return wireless signal and a processor configured to determine phase of the return wireless signal at an inial moment in time, to time a predefined period of time, and to determine phase at a subsequent moment in time after the predefined period of time to monitor movement of the radio frequency identification device.

24. The system according to claim 23 wherein the processor is configured to determine the phase of the return wireless signal to determine a speed of the radio frequency identification device.

25. The system according to claim 23 wherein the interrogator is configured to determine the phase of the return wireless signal to determine a distance of travel of the radio frequency identification device.

26. A method of operating an interrogator comprising steps of:
outputting a forward wireless signal;
receiving a return wireless signal from a radio frequency identification device;
processing the return wireless signal; and
monitoring movement of the radio frequency identification device after the processing.

27. The method according to claim 26 wherein the monitoring comprises determining speed of the radio frequency identification device.

28. The method according to claim 26 wherein the monitoring comprises determining a distance of travel of the radio frequency identification device.

29. The method according to claim 26 wherein the processing comprises determining phase of the return wireless signal at a plurality of moments in time.

30. The method according to claim 26 wherein the processing comprises determining phase of the return wireless signal at a predefined moment in time.

31. The method according to claim 26 wherein the monitoring includes:
   determining phase of the return wireless signal at an initial moment in time;
   timing a predefined period of time; and
   determining phase of the return wireless signal at a subsequent moment in time.

32. A method of monitoring movement of a radio frequency identification device comprising steps of:
   outputting a forward wireless signal using an interrogator;
   receiving the forward wireless signal using a radio frequency identification device;
   outputting a return wireless signal using the radio frequency identification device;
   receiving the return wireless signal using the interrogator; and
   monitoring movement of the radio frequency identification device responsive to the receiving the return wireless signal.

33. The method according to claim 32 wherein the monitoring comprises monitoring using the interrogator.

34. The method according to claim 32 wherein the monitoring comprises determining speed of the radio frequency identification device.

35. The method according to claim 32 wherein the monitoring comprises determining a distance of travel of the radio frequency identification device.

36. The method according to claim 32 wherein the processing comprises determining phase of the return wireless signal at a plurality of moments in time.

37. The method according to claim 32 wherein the processing comprises determining phase of the return wireless signal at a predefined moment in time.

38. The method according to claim 32 wherein the monitoring includes:
   determining phase of the return wireless signal at an initial moment in time;
   timing a predefined period of time after the determining; and
   determining phase of the return wireless signal at a subsequent moment in time.

39. A method of monitoring movement of a remote communication device comprising steps of:
   outputting a forward wireless signal;
   receiving the forward wireless signal using a remote communication device;
   outputting a return wireless signal using the remote communication device;
   receiving a return wireless signal;
   determining phase of the return wireless signal at a plurality of moments of time; and
   monitoring movement of the remote communication device after the determining.

40. The method according to claim 39 wherein the monitoring comprises monitoring using the interrogator.

41. The method according to claim 39 wherein the monitoring comprises determining speed of the remote communication device.

42. The method according to claim 39 wherein the monitoring comprises determining a distance of travel of the remote communication device.

43. The method according to claim 39 wherein the determining comprises determining phase of the return wireless signal at one predefined moment in time.

44. The method according to claim 39 wherein the determining comprises:
   determining phase of the return wireless signal at an initial point in time;
   timing a predefined period of time after the determining; and
   determining phase of the return wireless signal at a subsequent point in time after the timing.

45. A movement monitoring method comprising steps of:
   applying a wireless signal to a wireless communication device;
   reflecting at least some of the wireless signal using the wireless communication device;
   determining phase of the reflected wireless signal at an initial point in time;
   timing a predefined period of time after the determining; and
   determining phase of the reflected wireless signal at a subsequent point in time after the timing.

46. The method according to claim 45 wherein the applying, determinings, and timing individually comprise using an interrogator of a radio frequency identification device communication system.

47. The method according to claim 45 further comprising determining a speed of the wireless communication device after the determinings.

48. The method according to claim 45 further comprising determining a distance of travel of the wireless communication device after the determinings.

49. The method according to claim 45 wherein the reflecting comprises modulating the wireless signal using the wireless communication device comprising a radio frequency identification device.

50. A method of monitoring movement of a radio frequency identification device comprising steps of:
   providing a wireless communication system including an interrogator and a radio frequency identification device;
   generating a forward wireless signal having a frequency using the interrogator;
   communicating the forward wireless signal to a radio frequency identification device;
   reflecting at least some of the forward wireless signal using a radio frequency identification device;
   receiving the reflected wireless signal using the interrogator;
   determining phase of the reflected wireless signal at an initial point in time;
   timing a predefined period of time after the determining;
   determining phase of the reflected wireless signal at a subsequent point in time after the timing;
   determining speed of the radio frequency identification device using the phase of the reflected wireless signal at the initial point in time, using the phase of the reflected wireless signal at the subsequent point in time, and using the predefined period of time; and
   determining a distance of travel of the radio frequency identification device using the speed and predefined period of time.

51. The interrogator according to claim 1 wherein the communication circuitry is configured to receive the return wireless signal at a single location and the processor is configured to monitor movement of the radio frequency identification device only using the return wireless signal received at the single location.

52. The interrogator according to claim 1 wherein the processor is configured to monitor movement of the radio frequency identification device without position information of the radio frequency identification device.

53. The interrogator according to claim 1 wherein the communication circuitry comprises coherent transmit circuitry and receive circuitry respectively configured to output the forward wireless signal and to receive the return wireless signal.

54. The system according to claim 12 wherein the interrogator is configured to receive the return wireless signal at a single location and to monitor movement of the radio frequency identification device only using the return wireless signal received at the single location.

55. The system according to claim 12 wherein the interrogator is configured to monitor movement of the radio frequency identification device without position information of the radio frequency identification device.

56. The system according to claim 12 wherein the interrogator comprises coherent transmit circuitry and receive circuitry respectively configured to output the forward wireless signal and to receive the return wireless signal.

57. The system according to claim 18 wherein the remote communication device comprises a radio frequency identification device.

58. The method according to claim 26 wherein the receiving comprises receiving at a single location and the monitoring comprises monitoring using only the return wireless signal received at the single location.

59. The method according to claim 26 wherein the monitoring comprises monitoring movement without position information of the radio frequency identification device.

60. The method according to claim 26 wherein the outputting and the receiving comprise outputting and receiving using respective ones of coherent transmit circuitry and receive circuitry.

61. The method according to claim 32 wherein the receiving comprises receiving at a single location and the monitoring comprises monitoring using only the return wireless signal received at the single location.

62. The method according to claim 32 wherein the monitoring comprises monitoring movement without position information of the radio frequency identification device.

63. The method according to claim 32 wherein the outputting and the receiving comprise outputting and receiving using respective ones of coherent transmit circuitry and receive circuitry.

64. The method according to claim 39 wherein the receiving comprises receiving using the remote communication device comprising a radio frequency identification device.

65. The system according to claim 18 wherein the processor is configured to determine the phase of the return wireless signal at the plurality of moments in time during one period of the return wireless signal.

* * * * *

UNITED STATES PATENT AND TRADEMARK OFFICE
CERTIFICATE OF CORRECTION

PATENT NO. : 6,356,230 B1
DATED : March 12, 2002
INVENTOR(S) : Roy Greeff and David K. Ovard It is certified that error appears in the above-identified patent and that said Letters Patent is hereby corrected as shown below:

<u>Title page,</u>
Item [75], Inventor Greeff, please delete "Greef" and insert -- Greeff --.

<u>Column 7,</u>
Line 40, please delete "is" after "transmit".

<u>Column 8,</u>
Line 11, please delete "Devices" and insert -- Device -- at the beginning of line 11.

<u>Column 10,</u>
Line 47, please delete "wirless" and insert -- wireless -- after "return".

<u>Column 12,</u>
Line 31, please delete "inial" and insert -- initial -- after "an".

Signed and Sealed this

Twentieth Day of August, 2002

Attest:

JAMES E. ROGAN
*Attesting Officer*     *Director of the United States Patent and Trademark Office*